(12) United States Patent
Malladi et al.

(10) Patent No.: US 10,282,436 B2
(45) Date of Patent: May 7, 2019

(54) MEMORY APPARATUS FOR IN-PLACE REGULAR EXPRESSION SEARCH

(71) Applicant: Samsung Electronics Co., Ltd., Suwon-si, Gyeonggi-do (KR)

(72) Inventors: Krishna T. Malladi, San Jose, CA (US); Hongzhong Zheng, Los Gatos, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 4 days.

(21) Appl. No.: 15/470,709

(22) Filed: Mar. 27, 2017

(65) Prior Publication Data

US 2018/0188968 A1    Jul. 5, 2018

Related U.S. Application Data

(60) Provisional application No. 62/442,324, filed on Jan. 4, 2017.

(51) Int. Cl.
*G06F 12/02* (2006.01)
*G06F 17/30* (2006.01)

(52) U.S. Cl.
CPC .. *G06F 17/30312* (2013.01); *G06F 17/30985* (2013.01)

(58) Field of Classification Search
CPC .... G06F 3/0608; G06F 3/0626; G06F 3/0638; G06F 3/0688; G06F 17/30312; G06F 17/30477
See application file for complete search history.

(56) References Cited

U.S. PATENT DOCUMENTS

| 6,438,560 B1 | 8/2002 | Loen |
| 7,650,460 B2 | 1/2010 | Cheriton |
| 7,916,510 B1 * | 3/2011 | Starovoitov ........... G11C 15/04 365/49.1 |
| 8,055,601 B2 | 11/2011 | Pandya |
| 8,065,476 B2 | 11/2011 | Cheriton |

(Continued)

OTHER PUBLICATIONS

M. Paolieri, I. Bonesana and M. D. Santambrogio, "ReCPU: A parallel and pipelined architecture for regular expression matching," 2007 IFIP International Conference on Very Large Scale Integration, Atlanta, GA, USA, 2007, pp. 19-24. (Year: 2007).*

(Continued)

*Primary Examiner* — Ramon A. Mercado
(74) *Attorney, Agent, or Firm* — Lewis Roca Rothgerber Christie LLP

(57) ABSTRACT

A method of searching for data stored in a memory, the method including receiving a regex search request, generating a parse tree including fundamental regex operations corresponding to the regex search request, individually analyzing each of the fundamental regex operations of the generated parse tree in a respective time-step, determining a memory address location of data corresponding to the analyzed fundamental regex operations by using a translation table to determine whether the data exists, and using a reverse translation table to determine the memory address location of the data, and outputting data matching the regex search request after analyzing all of the fundamental regex operations of the generated parse tree.

20 Claims, 4 Drawing Sheets

(56) References Cited

U.S. PATENT DOCUMENTS

| | | |
|---|---|---|
| 8,230,168 B2 | 7/2012 | Cheriton |
| 8,239,340 B2 | 8/2012 | Hanson |
| 8,495,334 B2 * | 7/2013 | Biran ............... G06F 17/30985 711/156 |
| 8,504,791 B2 | 8/2013 | Cheriton et al. |
| 8,612,673 B2 | 12/2013 | Cheriton |
| 8,799,188 B2 | 8/2014 | Biran et al. |
| 8,843,508 B2 | 9/2014 | Thorup et al. |
| 8,938,580 B2 | 1/2015 | Cheriton |
| 9,098,587 B2 | 8/2015 | Deshmukh et al. |
| 9,258,225 B2 | 2/2016 | Hill et al. |
| 9,471,713 B2 | 10/2016 | Lunteren |
| 9,501,421 B1 | 11/2016 | Cheriton |
| 9,520,193 B2 | 12/2016 | Cheriton |
| 9,785,571 B2 * | 10/2017 | Shiu .................. G06F 3/061 |
| 2013/0275699 A1 | 10/2013 | Cheriton |
| 2015/0074339 A1 | 3/2015 | Cheriton |
| 2016/0291891 A1 | 10/2016 | Cheriton |
| 2017/0109049 A1 | 4/2017 | Cheriton |

OTHER PUBLICATIONS

I. Bonesana, M. Paolieri and M. D. Santambrogio, "An adaptable FPGA-based System for Regular Expression Matching," 2008 Design, Automation and Test in Europe, Munich, 2008, pp. 1262-1267. (Year: 2008).*

M. X. Wang, K. Suzuki, W. W. -. Dai, Y. L. Low, K. J. O'Conner and K. L. Tai, "Integration of large-scale FPGA and DRAM in a package using chip-on-chip technology," Proceedings 2000. Design Automation Conference. (IEEE Cat. No. 00CH37106), Yokohama, pp. 205-210. (Year: 2000).*

Cheriton, David, et al., "HICAMP: Architectural Support for Efficient Concurrency-safe Shared Structured Data Access", ASPLOS XVII Proceedings of the seventeenth international conference on Architectural Support for Programming Languages and Operating Systems, Mar. 3-7, 2012, pp. 287-300.

Litz, Heiner, et al., "Fine-grain Memory Deduplication for In-Memory Database Systems", Stanford University, 2013, 22 pages.

Kim, Yoongu, "HICAMP: Architectural Support for Efficient Concurrency-Safe Shared Structured Data Access—Cheriton et al.,", ASPLOS 2012; Nov. 18, 2013 (43 pages).

Stevenson, John Peter; "Fine-Grain In-Memory Deduplication for Large-Scale Workloads"; A Dissertation Submitted to the Department of Electrical Engineering and the Committee on Graduate Studies of Stanford University in Partial Fulfillment of the Requirements for the Degree of Doctor of Philosophy; http://purl.stanford.edu/rp831pi6163; Dec. 2013 (140 pages).

* cited by examiner

MEMORY APPARATUS FOR IN-PLACE REGULAR EXPRESSION SEARCH

CROSS-REFERENCE TO RELATED APPLICATION(S)

This application claims priority to, and the benefit of, U.S. Provisional Application Ser. No. 62/442,324, filed on Jan. 4, 2017, the entire content of which is incorporated herein by reference.

FIELD

One or more aspects of embodiments according to the present invention generally relate to regular expression searches, and to a memory apparatus for in-place regular expression searches.

BACKGROUND

Data deduplication, or data duplicate elimination, refers to the reduction of redundant data in a memory device to thereby reduce capacity cost of the memory device. In data deduplication, a data file is partitioned into one or more chunks, or blocks, of data. By associating a plurality of the blocks of data consisting of identical data with a single stored block of data, duplicate copies of the blocks of data may be reduced or eliminated by a computer memory, thereby decreasing the number of redundant copies of data in the memory device.

Accordingly, if duplicated copies of data can be reduced to a single copy of the data, the overall available capacity of the memory device is increased while using the same amount of physical resources. Because the resultant economization of the memory device allows for a reduction in a data rewrite count, and because write requests for duplicated blocks of data that are already stored in the memory may be discarded, a life span of a memory device that implements data deduplication can be prolonged by effectively increasing write endurance.

Conventional methods of data deduplication have most commonly been used for hard drives. However, there is interest in providing for fine grain deduplication in the area of volatile memory, such as dynamic random-access memory (DRAM).

In the field of data searching, a regular expression (e.g., a "regex" or "regexp" for short) is a special text string used to describe a search pattern to allow for certain patterns and groups of data to be found when searching. A regular expression ("regex") operation may include substring matching and/or pattern matching. Accordingly, regex operations are widely used in many modern applications and in many domains, such as network security, text analytics, bioinformatics, and finance.

Problems of conventional solutions for software-based regex engines include low performance due to streaming methodology, and, between NFA vs DFA technologies, DFA is typically preferred due to its low complexity despite having relatively low performance. Further, it may be noted that DFA limits a state machine to be in single state at a given time, while NFA allows for parallel state exploration with the state machine progressing to multiple states at the same time. Additionally, problems of conventional solutions for hardware-based regex engine implementations are that they still have limited memory capacity, and that they need to stream data to find a regex match, while having high latency, high energy, and relatively low performance.

The above information disclosed in this Background section is only to enhance the understanding of the background of the invention, and therefore it may contain information that does not constitute prior art.

SUMMARY

Aspects of embodiments of the present disclosure are directed toward a system and method for in-place pattern matching and substring matching inside memory.

According to an embodiment of the present invention, there is provided a method of searching for data stored in a memory, the method including receiving a regex search request, generating a parse tree including fundamental regex operations corresponding to the regex search request, individually analyzing each of the fundamental regex operations of the generated parse tree in a respective time-step, determining a memory address location of data corresponding to the analyzed fundamental regex operations by using a translation table to determine whether the data exists, and using a reverse translation table to determine the memory address location of the data, and outputting data matching the regex search request after analyzing all of the fundamental regex operations of the generated parse tree.

The method may further include using logic gates to process the fundamental regex operations, and the fundamental regex operations may include at least one of a concatenation operation, an or operation, a closure operation, or a parenthesis operation.

Receiving the regex search request may include receiving the regex search request at a computer application.

Generating the parse tree including the fundamental regex operations may include receiving the regex search request at a driver, and using the driver to generate the parse tree.

Outputting the data matching the regex search request may include generating a value and address location corresponding to the data.

Determining the memory address location of data corresponding to the analyzed fundamental regex operations may include using a pointer to indicate a starting memory address of the data, and using a counter to indicate a number of memory addresses from the starting memory address having the data.

The method may further include storing the data in the deduplicated format, wherein a same logic is used for storing the data and for generating the parse tree.

The method may further include setting a minimum substring match ability, providing a rolling window covering a portion of a searched pattern corresponding to the regex search request, and, upon finding a match within the rolling window, searching for data having an address location immediately prior to or immediately subsequent to an address location of data corresponding to the match within the rolling window.

According to an embodiment of the present invention, there is provided a system for searching for data stored in a memory, the system including a processor of a regex module configured to communicate with a host CPU, and a memory having instructions stored thereon that, when executed by the processor, cause the processor to receive a regex search request, generate a parse tree including fundamental regex operations corresponding to the regex search request, individually analyze each of the fundamental regex operations of the generated parse tree in a respective time-step, determine a memory address location of data corresponding to the analyzed fundamental regex operations, and output data matching the regex search request after all of the fundamental regex operations of the generated parse tree are analyzed.

The fundamental regex operations may include at least one of a concatenation operation, an or operation, a closure operation, or a parenthesis operation.

The instructions, when executed by the processor, may cause the processor to receive the regex search request by receiving the regex search request at a computer application.

The instructions, when executed by the processor, may cause the processor to generate the parse tree including the fundamental regex operations by receiving the regex search request at a driver, and using the driver to generate the parse tree.

The instructions, when executed by the processor, may cause the processor to determine a memory address location of the data corresponding to the analyzed fundamental regex operations by using a translation table to determine whether the data exists, and using a reverse translation table to determine the memory address location of the data.

The instructions, when executed by the processor, may cause the processor to determine the memory address location of the data corresponding to the analyzed fundamental regex operations by using a pointer to indicate a starting memory address of the data, and using a counter to indicate a number of memory addresses from the starting memory address having the data.

The instructions, when executed by the processor, may cause the processor to output the data matching the regex search request by generating a value and address location corresponding to the data.

According to an embodiment of the present invention, there is provided a system for searching for data stored in a memory, the system including an application configured to receive a regex search request, a driver configured to generate a parse tree including fundamental regex operations corresponding to the regex search request, and a regex module configured to individually analyze each of the fundamental regex operations of the generated parse tree in a respective time-step, and determine a memory address location of data corresponding to the analyzed fundamental regex operations, wherein the application is further configured to output data matching the regex search request after all of the fundamental regex operations of the generated parse tree are analyzed.

The fundamental regex operations may include at least one of a concatenation operation, an or operation, a closure operation, or a parenthesis operation.

The driver may be configured to generate the parse tree including the fundamental regex operations after receiving the regex search request from the application.

The regex module may be configured to determine the memory address location of the data corresponding to the analyzed fundamental regex operations by using a translation table to determine whether the data exists, and using a reverse translation table to determine the memory address location of the data.

The regex module may be configured to determine the memory address location of the data corresponding to the analyzed fundamental regex operations by using a pointer to indicate a starting memory address of the data, and using a counter to indicate a number of memory addresses from the starting memory address having the data.

The application may be configured to output the data matching the regex search request by receiving a value and address location corresponding to the data from the regex module.

Accordingly, embodiments of the present invention provide a novel, ground-up architecture that is able to provide in-place pattern matching and substring matching inside dynamic random-access memory (DRAM) while using resources of the DRAM. Unlike conventional regex hardware accelerators, the described embodiments provide large memory capacities on a memory module, while also providing the ability to deduplicate the memory region, by allowing for hardware-based regex search requests on DRAM, and by using the DRAM deduplication architecture to implement the regex search.

The described embodiments also provide a novel rolling-window methodology for finding all data matches stored within the memory module.

The described embodiments also provide a reverse translation table for tracking all of the data matches at the given hardware granularity for matches.

BRIEF DESCRIPTION OF THE DRAWINGS

These and other aspects of embodiments of the present invention will be appreciated and understood with reference to the specification, claims, and appended drawings wherein:

DETAILED DESCRIPTION

Figure 1:
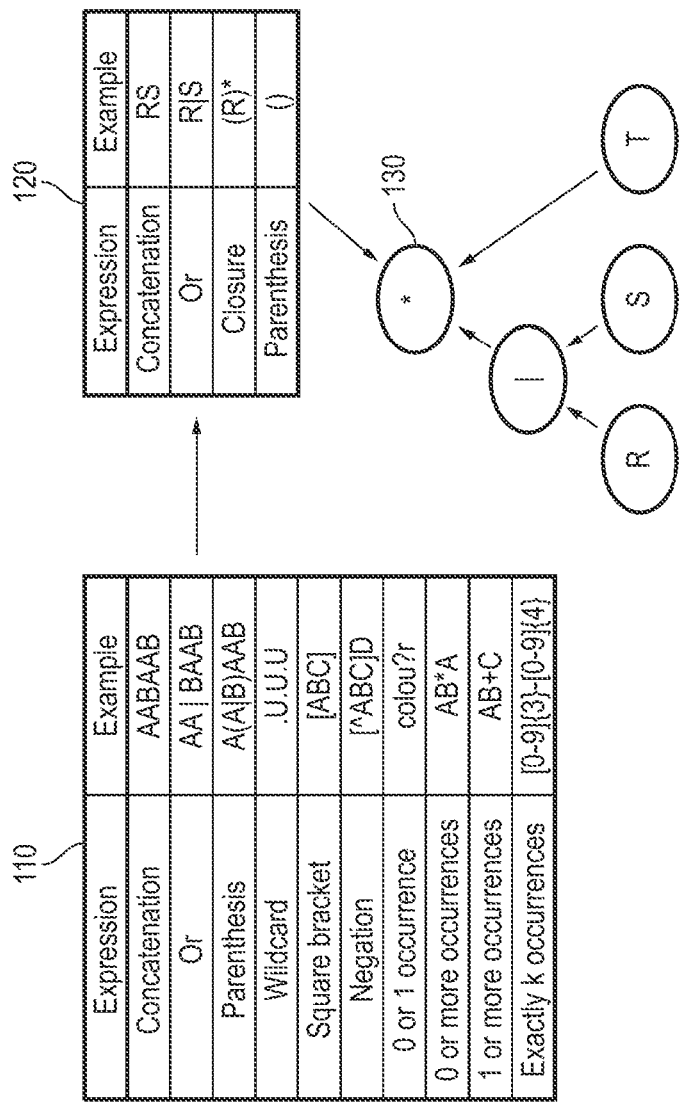
FIG. 1 illustrates a method of reducing complex common regex operations into a parse tree having a smaller number of basic fundamental regex operations, according to an embodiment of the present invention.

Aspects of embodiments of the present disclosure are directed toward a system and method for in-place pattern and substring matching inside a memory.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the described embodiments.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 illustrates a method of reducing complex common regex operations into a parse tree having a smaller number of basic fundamental regex operations, according to an embodiment of the present invention.

Referring to FIG. 1, a conventional deduplication engine (e.g., of a dedupe RAM) recognizes and stores unique content in memory, such that the deduplication engine can break down input regex search requests into basic patterns. Thereafter, a deduplication hash algorithm can be used to search for data matches. Accordingly, certain aspects of a conventional in-DRAM deduplication system can be reused to implement a regex search, according to the present embodiments. The overall supporting framework of the present embodiments may include a system, a microarchitecture, and a driver for end-to-end solutions. The present embodiments may also provide the ability to adjust symbol granularity while implementing a novel rolling window method for substring matches and pattern matches. The present embodiments may further provide a novel reverse translation table design and application usage methodologies. The present embodiments may be implemented by implementing concepts for a regex search.

The present embodiments may break down a regex search request including a single complex pattern into basic patterns that are already deduplicated and stored using a hash table, and that can be implemented as a plurality of deduplicated simple patterns. Additionally, a hash algorithm may be used to search for data matches, and to provide a framework for supporting the breakdown of the regex search requests. That is, an engine of a memory module of the present embodiment can break down a regex search request corresponding to one or more common regex operations 110 into a parse tree 130 that is made up of a relatively small number of fundamental regex operations 120.

Common regex operations 110 corresponding to regex search requests may be equivalently represented by different respective combinations of fundamental regex operations 120, which can in turn be represented by an operations tree/parse tree 130. That is, regex search requests logically have several complex common regex operations 110, which can be broken down into a series of simpler fundamental regex operations 120. The fundamental regex operations 120 can be placed together on a parsing tree 130 to recreate the original regex search request corresponding to the common regex operations 110.

Accordingly, the present embodiment may use logic (e.g., digital logic 317 in FIG. 3) to implement the common regex operations 110 in the form of a parse tree 130 by converting a complex regex search request into a parse tree 130 that is made up of simple, fundamental regex operations 120 (e.g., made up of a combination of concatenation, "or", closure, and parenthesis operators).

To implement the conversion of common regex operations 110 into the parse tree 130 of fundamental regex operations 120, the present embodiment provides logic 317 that is able to perform the individual fundamental regex operations 120, and that is also able to combine the individual fundamental regex operations 120 in a parse tree 130 to collectively act as one or more common regex operations 110.

Once a regex search request is converted into a parse tree 130 of fundamental regex operations 120, those fundamental regex operations 120 can be performed on deduplicated data. Furthermore, the present embodiment provides a reverse translation table/reverse table lookup for storing results corresponding to the regex search request.

With respect to the reverse translation table, while the deduplication table stores the system memory address to an internal location address or a "translation table address," which is a hash function of data, the reverse translation table effectively stores the opposite. Accordingly, the symbol that is being searched for is hashed to calculate the "translation table address," which is then used to index into the reverse translation table. The results provide the system addresses that store the symbol being looked up.

The regex search request may be broken down into the parse tree 130 by using a user library 340 (FIG. 3) to convert the regex search request to the parse tree 130, and by using only fundamental regex operations 120 (i.e. (OR), (CAT), (*), ( ) which respectively correspond to "or," concatenation, closure, and parenthesis operations).

In the present embodiment, the dedupe DRAM stores unique content, and is intended to store only one copy of the content. Thereafter, the dedupe DRAM also stores an address translation table to indicate where each unique copy of data is stored, and to also indicate how many copies of the unique data exist. Accordingly, individual regex search requests may be performed by using the address translation table and the reverse translation table, as described above. This may be accomplished by using post-order parse tree traversal, and by using an extended translation table 240 (see FIG. 2) to mark symbol matches. The extended translation table 240 is a combination of translation table and the reverse translation table, which are described above.

Accordingly, unique data content can be searched by using unique content fields to find a match of the desired content. However, thereafter, an effective search operation should also indicate where the desired content is stored. That is, the extended translation table 240 can be used to determine whether the data is present somewhere in memory, but cannot be used to determine where the data is located. Accordingly, the present embodiment also provides an additional reverse translation table, which is functionally separate from the extended translation table 240, to determine where the desired data content is stored by determining a match location of the desired data content.

Figure 2:
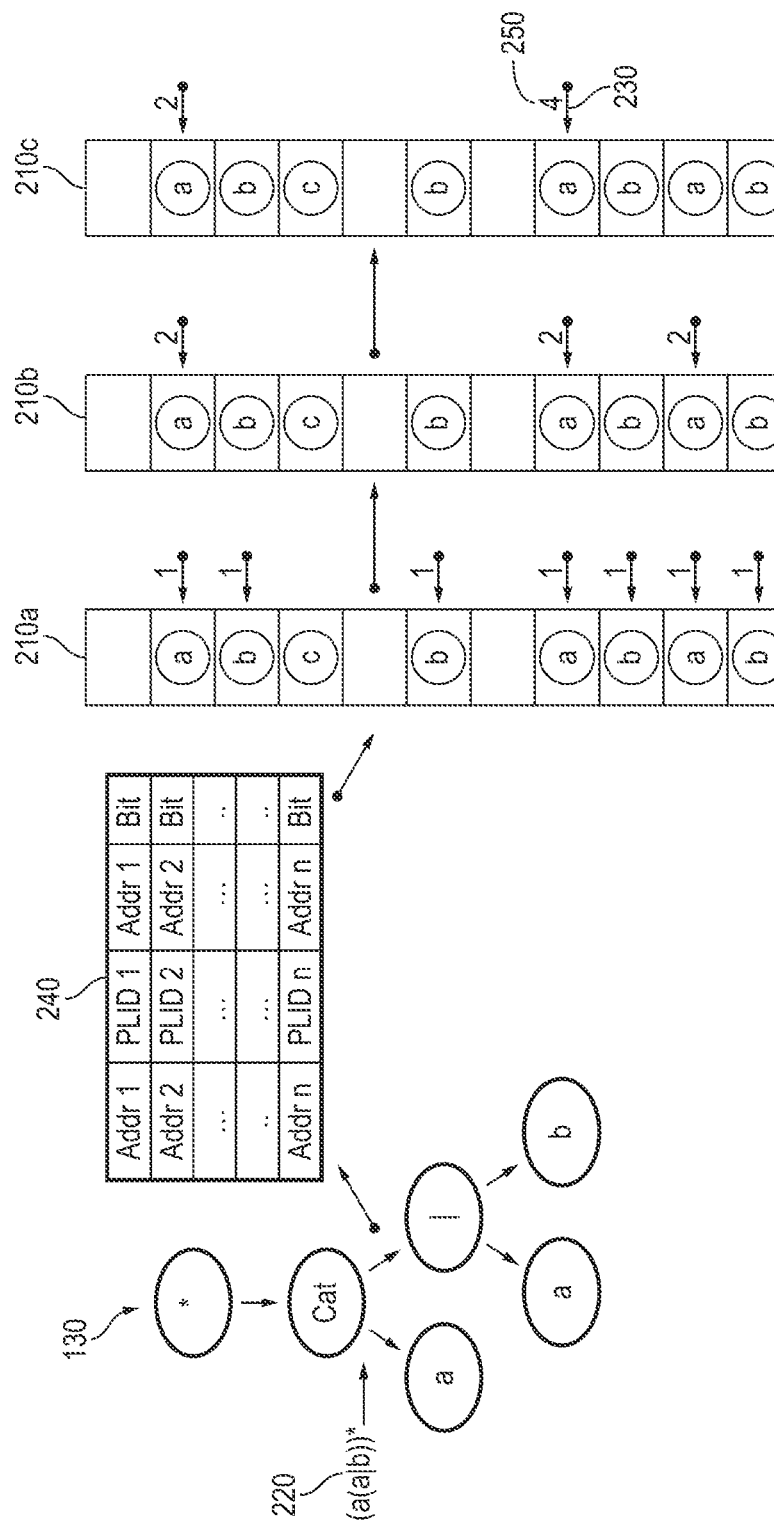
FIG. 2 illustrates a method of using a parse tree representing a complex common regex operation using fundamental regex operations that are respectively implemented during different time-steps to perform a regex search request, according to an embodiment of the present invention.

FIG. 2 illustrates a method of using a parse tree representing a complex common regex operation using fundamental regex operations that are respectively implemented during different time-steps to perform a regex search request, according to an embodiment of the present invention.

Referring to FIG. 2, a parse tree 130, an extended translation table 240, and time-step progression of a method of the present embodiment are shown. That is, FIG. 2 depicts an example of the time-step progress of an example regex search.

A regex module, which is described in further detail below, may break down the regex search request of the present example (e.g., (a(a|b))*, or the closure of "a" concatenated with "a" or "b") at the input regex search request 220 into a parse tree 130 having different branches of fundamental regex operations 120. That is, the regex search request can be decomposed into a regular expression parse tree 130 at the input regex search request.

The fundamental regex operations 120 of the regex search request may logically progress in time-steps 210. At each time-step 210, only data that matches the corresponding fundamental regex operation 120 of a corresponding branch of the parse tree 130 are moved forward. That is, the digital logic 317 (see FIG. 3) used by the present embodiment individually processes each of the fundamental regex operations 120 in a respective time-step 210, and filters out unwanted or non-applicable data that is unrelated to the input regex search request 220. At each time-step 210, the present embodiment uses flags/tags/pointers 230 to indicate eligible matches corresponding to the regex search 220 as they correspond to the fundamental regex operation 120 of that corresponding time-step 210. This may be accomplished by using a translation table 240 and a reverse translation table. The translation table 240 indicates the size of the data patterns (e.g., 8-byte patterns).

In the present example, the regex search request 220 is input. Then, the regex search request 220 is used to generate the parse tree 130 composed of the individual fundamental regex operations 120 that collectively form the regex search request 220. Then, each of the individual fundamental regex operations 120 of the regex search request 220 is searched on the translation table 240 in the order dictated by the parse tree. That is, the digital logic 317 of the present embodiment progresses in time-steps 210 by moving one step up the parse tree 130 for each time-step 210.

For the first time-step 210a, in response to the input regex search request of the present example (e.g., the closure of "a" or "b" concatenated with "a"), locations in the memory that store either an "a" or a "b" are determined. Accordingly, all locations having either an "a" or "b" are flagged using pointers 230. Additionally, a counter 250 is used to indicate how many memory addresses, or memory address locations, from the pointer 230 correspond to the qualifying data. Accordingly, all locations in the memory storing either an "a" or a "b" are flagged with a pointer 230, and because a maximum of only one memory address can store either an "a" or a "b," each pointer 230 has a corresponding counter 250 of "1." That is, the pointer 230 indicates that the matching data begins at the flagged memory address (e.g., a beginning memory address), and the counter 250 indicates the number of memory addresses from the flagged memory address that include the matching data, which may be accomplished by use of the translation table 240.

For the second time-step 210b, the next fundamental regex operation 120 of the parse tree 130 is analyzed (e.g., an "a" that is next to an "a" or is next to a "b"). Accordingly, of the locations in memory that are flagged with a pointer 230 in the first time-step 210a, it is determined whether each flagged location is also next to at least one "a." That is, the digital logic 317 of the present embodiment checks everything that was flagged in the first time-step 210a to determine whether the data includes an "a" next to either an "a" or a "b." Accordingly, the isolated "b" shown in FIG. 2 isn't flagged during the second time-step 210b due to the lack of an "a" next to the "b."

Finally, for the third time-step 210c, the next and final fundamental regex operation 120 of the parse tree 130 is analyzed (e.g., closure of "a" concatenated with "a" or "b"). Accordingly, of the locations in memory that are flagged with a pointer 230 in the second time-step 210b, it is determined what contiguous memory addresses include the data corresponding to the input regex search request 220. Accordingly, the counters 250 and pointers 230 are updated to indicate the data blocks matching the input regex search request 220.

Accordingly, by using the parse tree 130, once the time-steps 210 of the operation are completed, it may be determined whether the searched-for pattern exists (e.g., whether there is a pattern match). If the searched-for pattern corresponding to the regex search request 220 does exist, as may be determined using the extended translation table 240, it may be determined in which data block(s) the searched-for pattern is located by using the reverse translation table.

That is, the present embodiment uses the reverse translation table because regex operations use the location of the data corresponding to the regex search request. However, a conventional deduplication path is generally only able to confirm the presence, or existence, of the data. That is, the dedupe write path is generally only able to confirm the existence of the searched-for data in memory, but cannot provide the specific location of the data. Accordingly, the reverse translation table may ensure the determination of a location(s) of a match to proceed across the time-steps 210 discussed above. The reverse translation table may index by physical line ID (PLID)/translation table address (TTA), and may thereby store memory addresses. A relatively large reverse translation table may be used to offset perfect hashing efficiency below 4 bytes. The reverse translation table may have the same design as the extended translation table 240, and may add additional overhead at low granularities.

Additionally, it should be noted that the present embodiment provides improved performance and efficiency by using separately programmed "substring match," and "pattern match" for size efficiency, and by using pre-hash common ranges (e.g., [0-9], [a-z], etc.), while parallelizing lookups to improve speed.

Figure 3:
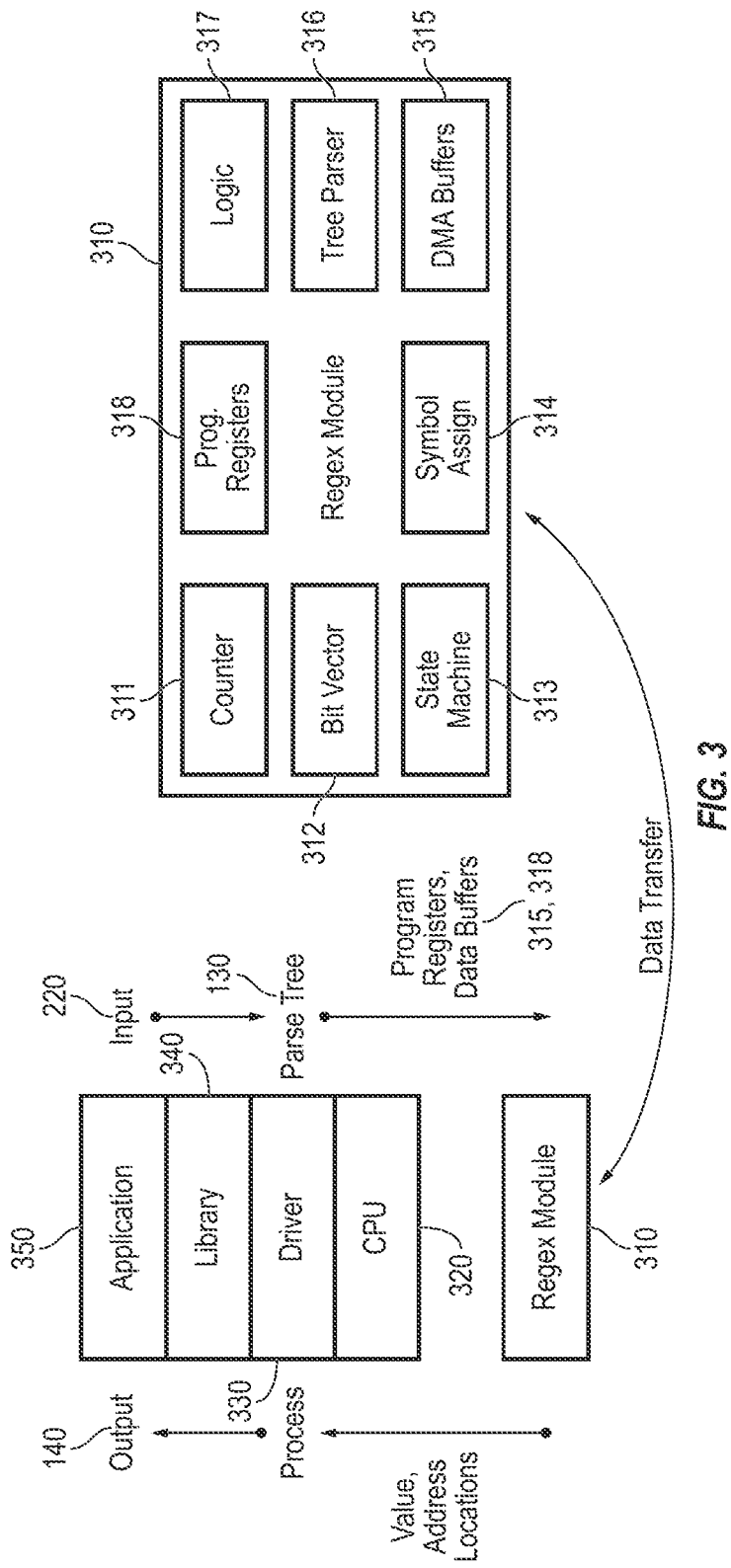
FIG. 3 illustrates a block diagram of a system architecture, a regex module architecture, and an architectural dataflow, according to an embodiment of the present invention.

FIG. 3 illustrates a block diagram of a system architecture, a regex module architecture, and an architectural dataflow, according to an embodiment of the present invention.

Referring to FIG. 3, an example regex module 310 may include a counter 311, which may be used for counting a number of contiguous matches of desired pattern in a regex search request, a bit vector 312, which may highlight the matched locations, a state machine 313, a symbol assign 314, DMA buffers 315, which may be used to enable data transfer from the host or remote server via a driver 330, program registers 318, which may specify inputs for programmable features, and, as described above, logic (e.g., digital logic) 317 and a tree parser 316.

In the present embodiment, an application (e.g. a computer application, or a user interface) 350 may receive a regex search request 220 (e.g., from a user), and may give the input regex search request 220 to the driver 330. Then, the driver 330 may generate the parse tree 130, may program the regex module 310 based on the generated parse tree 130, and may pass the program registers 318 and data buffers 315 of the CPU 320 through to the regex module 310.

Accordingly, the regex module 310 receives information corresponding to the regex search request 220, and may perform a search to thereby provide a return value and a memory address(es) processed by the driver 330. That is, because a processor of the regex module 310 may be configured to communicate with the host CPU 320, the regex module 310 may use the information provided from the driver 330 and the CPU 320 to generate a value(s) and a memory address(es) corresponding to the desired data corresponding to the regex search request 220. The value(s) and memory address(es) may correspond to the pointers 230 and counters 250 of FIG. 2, and may be passed on by the regex module 310 to the driver 330.

The driver 330 then processes the value(s) and memory address(es) to retrieve the data found as a result of the regex search request 220, and to output the output data 140 to the application 350 that entered the regex search request 220.

As described above, the microarchitecture of the present embodiment may use a pointer 230 and a counter 250. The pointer 230 may be used to indicate the location(s) of all recognized regex matches for a given time-step 210, and may also be used for implementation of the operation of concatenation. The counter 250 may be used to count a number of contiguous memory addresses including data corresponding to a match in a return of a given regex search request. The counter 250 may also be used to indicate the length, or size, of the matching data from the starting memory address corresponding to the pointer 230. Accordingly, by using the pointer 230 and counter 250 in conjunction, the return is able to use the pointer 230 to indicate the memory address at which the regex starts, and is able to use the counter 250 to indicate how many memory addresses following the pointer 230 include the matches of the return of the regex search request.

The microarchitecture of the present embodiment may also include logic (e.g., digital logic) 317. The logic 317 may be used to recognize when a given stream is the same, may be used to perform simultaneous allowable matches, and may be used to implement "closure" and "or" operations.

The microarchitecture of the present embodiment may also use the separated time-steps 210 to prune the regexes of the parse tree 130 at each time-step 210, and to implement concatenation.

In the present embodiment, symbol granularity may be different for different applications (e.g., depending on the type of application 350). That is, there may be different application uses for pattern matching and for substring matching. Further, symbols may be about 1-8 bytes per pattern, with the symbol length/the number of bytes per pattern being higher for substrings.

Additionally, it should be noted that overheads may generally increase as granularity size of the data decreases. That is, the finer the granularity corresponding to the regex search, or the smaller the pattern is, the greater the amount of deduplication overhead is used to track the data pattern. Accordingly, granularity may affect the substring matches.

In some implementations, the DRAM device may have separate pattern and substring modules to handle the different granularities, which may also be programmed by the driver 330. For example, there may be a string that has a size that is not aligned with the size of one of the deduplication blocks, such as if there is an 8-byte deduplication block, and if there is a 32-byte string, the dedupe engine of the present embodiment will track across at least four 8-byte dedupe blocks. However, the dedupe blocks might not be aligned with the searched-for data.

Furthermore, depending on the type of the application 350, different characteristics may be associated with the present embodiment. For example, for network security applications, the present embodiment may use "SNORT" ruleset matching, and may implement fine-grain granularity by using character classes. For bioinformatics applications, the present embodiment may implement a motif search of DNA sequences (e.g., a single character corresponding to A, T, C, or G) or may implement a planted motif search (e.g., 17-25 characters, although mismatches could reduce the substring length).

For finance applications, the present embodiment may use sentiment analysis for driving finance decisions, and may use nouns, verbs, hash tags, etc., which may be only a few characters long. For big data analytics applications, the present embodiment may use text preprocessing, surveillance, text mining, recommendations, and bitmap indices, and will generally implement a larger symbol granularity (e.g., 1-8 bytes for patterns, or more than 8 bytes for substrings, with higher overheads corresponding to decreasing granularity). For very small granularity searches, the usage may be expanded, or the symbols may be padded to a larger size (e.g., 8 bytes).

Figure 4:
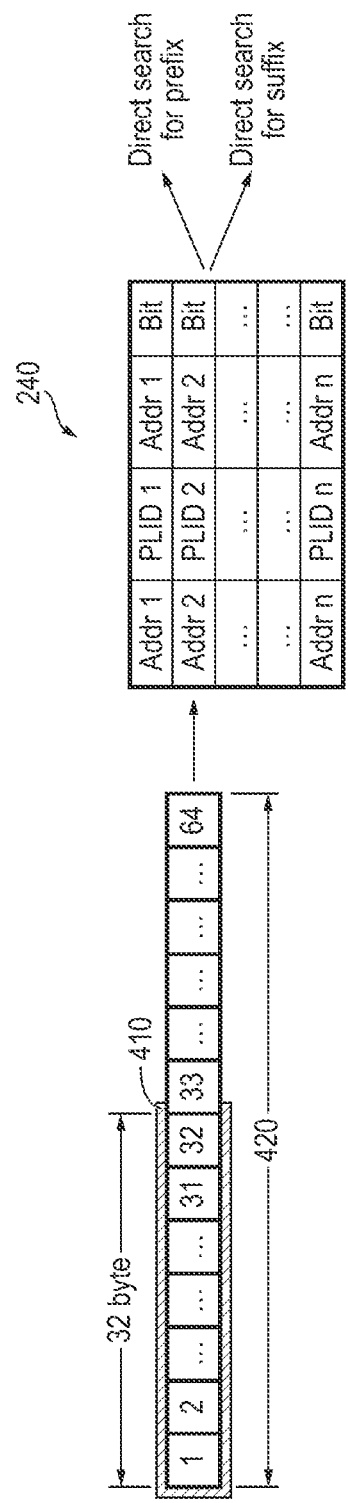
FIG. 4 illustrates a block diagram depicting a method of avoiding substring non-alignment across deduplication lines using a rolling window scan method.

FIG. 4 illustrates a block diagram depicting a method of avoiding substring non-alignment across deduplication lines using a rolling window scan method.

Referring to FIG. 4, the present embodiment may additionally use driver programs separately for substring matching or pattern matching, and may solve specific problems separately to obtain better efficiencies. One potential issue may occur when a substring or pattern is not aligned with the dedupe units (e.g., substring non-alignment across dedupe lines). Such a potential issue may be solved by using a rolling window scan method of embodiments of the present invention. The architecture of a rolling window 410 may set an application condition, such as a minimum substring match length/minimum string search length 420 having a length "N" of 64 bytes, and may build a granularity table/the rolling window 410 that is equal to half the minimum substring match length (e.g., a rolling window length "N/2" of 32 bytes), thereby achieving relatively high efficiency.

The rolling window 410 may ensure that non-aligned regex matches are detected. For example, the application may first set a condition on a minimum substring match ability by limiting it twice of table granularity table. Accordingly, the window may "roll" on the searched pattern until a midpoint. Then, at each point, the pattern covered in the rolling window 410 may be searched. If a match is discovered in the rolling window 410, then a prefix and suffix of the match may be looked for (i.e., data at immediately prior and immediately subsequent address locations), thereby ensuring that the match of the overall desired line is obtained. Only when there is a match of the searched line and the corresponding prefix and suffix, then the instance is identified as a regex match, and is recorded in the bit vector 312.

With respect to the rolling window scan method, symbol granularity provides the ability to choose the granularity at which an input regex request is broken down to, and searched for, using the look-up tables. Rolling window mechanism is a novel mechanism that helps to match symbols that are larger than a single character, and that spawn across multiple entries in the look-up table.

The present embodiment may also search directly for prefix and suffix values that are close to matched locations. Accordingly, if a regex search results in a hit on any portion of a string, then prefix and suffix values that are close to the matched location may be searched. That is, the prefix and suffix values can be searched to ensure that that the entire line is matched even when it is non-aligned (i.e., even when it is spread across lines).

Accordingly, the described embodiments provide a system architecture that is coupled with a module system-on-a-chip microarchitecture, with kernel driver, and with related framework. The embodiments provide the following: in-place regex search with both pattern and substring match by streaming in regex patterns rather than data into a memory device; a rolling window methodology to search for data matches that are not aligned to the predefined symbol granularity; implementation of a reverse translation table to track the location of data matches in a large capacity memory system; and dual and combined mechanism of deduplication and in-place regex search along. Additionally, the described embodiments allow for an effective deduplication ratio for regex at medium granularities.

While the present invention has been particularly shown and described with reference to exemplary embodiments thereof, it will be understood by those of ordinary skilled in the art that various changes may be made therein without departing from the scope of the present invention as defined by the following claims and their functional equivalents. Therefore, technical scope of the present invention should not be construed as limited to those described in the description, but determined by the appended claims and their functional equivalents.

What is claimed is:

1. A method of searching for data stored in a memory, the method comprising:
    receiving a regex search request;
    generating a parse tree comprising fundamental regex operations corresponding to the regex search request;
    individually analyzing each of the fundamental regex operations of the generated parse tree in a respective time-step;
    determining a memory address location of data corresponding to the analyzed fundamental regex operations by:

using a translation table to determine whether the data exists; and using a reverse translation table to determine the memory address location of the data, the data being stored in a deduplicated format;

outputting data matching the regex search request after analyzing all of the fundamental regex operations of the generated parse tree;

setting a minimum substring match ability;

providing a rolling window covering a portion of a searched pattern corresponding to the regex search request; and upon finding a match within the rolling window, searching for data having an address location immediately prior to or immediately subsequent to an address location of data corresponding to the match within the rolling window.

2. The method of claim 1, further comprising using logic gates to process the fundamental regex operations, wherein the fundamental regex operations comprise at least one of a concatenation operation, an or operation, a closure operation, or a parenthesis operation.

3. The method of claim 1, wherein receiving the regex search request comprises receiving the regex search request at a computer application.

4. The method of claim 1, wherein generating the parse tree comprising the fundamental regex operations comprises:

receiving the regex search request at a driver; and using the driver to generate the parse tree.

5. The method of claim 1, wherein outputting the data matching the regex search request comprises generating a value and address location corresponding to the data.

6. The method of claim 1, wherein determining the memory address location of data corresponding to the analyzed fundamental regex operations comprises:

using a pointer to indicate a starting memory address of the data; and using a counter to indicate a number of memory addresses from the starting memory address having the data.

7. The method of claim 1, further comprising storing the data in the deduplicated format, wherein a same logic is used for storing the data and for generating the parse tree.

8. A system for searching for data stored in a memory, the system comprising:

a processor of a regex module configured to communicate with a host CPU; and a memory having instructions stored thereon that, when executed by the processor, cause the processor to:

receive a regex search request;

generate a parse tree comprising fundamental regex operations corresponding to the regex search request;

individually analyze each of the fundamental regex operations of the generated parse tree in a respective time-step;

determine a memory address location of data corresponding to the analyzed fundamental regex operations by:

using a pointer to indicate a starting memory address of the data;

using a counter to indicate a number of memory addresses from the starting memory address having the data;

using a bit vector for storing matches; and eliminating non-matches at each of a plurality of time-steps using logic implementation; and output data matching the regex search request after all of the fundamental regex operations of the generated parse tree are analyzed.

9. The system of claim 8, further comprising logic gates configured to process the fundamental regex operations, wherein the fundamental regex operations comprise at least one of a concatenation operation, an or operation, a closure operation, or a parenthesis operation.

10. The system of claim 8, wherein the instructions, when executed by the processor, cause the processor to receive the regex search request by receiving the regex search request at a computer application.

11. The system of claim 8, wherein the instructions, when executed by the processor, cause the processor to generate the parse tree comprising the fundamental regex operations by:

receiving the regex search request at a driver; and using the driver to generate the parse tree.

12. The system of claim 8, wherein the instructions, when executed by the processor, cause the processor to determine a memory address location of the data corresponding to the analyzed fundamental regex operations by:

using a translation table to determine whether the data exists; and using a reverse translation table to determine the memory address location of the data.

13. The system of claim 8, wherein the instructions, when executed by the processor, cause the processor to output the data matching the regex search request by generating a value and address location corresponding to the data.

14. A system for searching for data stored in a memory of a memory module, the system comprising:

an application configured to receive a regex search request;

a driver configured to generate a parse tree comprising fundamental regex operations corresponding to the regex search request; and a regex module configured to:

individually analyze each of the fundamental regex operations of the generated parse tree in a respective time-step;

determine a memory address location of data corresponding to the analyzed fundamental regex operations;

set a minimum substring match ability;

provide a rolling window covering a portion of a searched pattern corresponding to the regex search request; and upon finding a match within the rolling window, search for data having an address location immediately prior to or immediately subsequent to an address location of data corresponding to the match within the rolling window, wherein the application is further configured to output data matching the regex search request after all of the fundamental regex operations of the generated parse tree are analyzed.

15. The system of claim 14, wherein the fundamental regex operations comprise at least one of a concatenation operation, an or operation, a closure operation, or a parenthesis operation.

16. The system of claim 14, wherein the driver is configured to generate the parse tree comprising the fundamental regex operations after receiving the regex search request from the application.

17. The system of claim 14, wherein the regex module is configured to determine the memory address location of the data corresponding to the analyzed fundamental regex operations by:
- using a translation table to determine whether the data exists; and
- using a reverse translation table to determine the memory address location of the data.

18. The system of claim 14, wherein the regex module is configured to determine the memory address location of the data corresponding to the analyzed fundamental regex operations by:
- using a pointer to indicate a starting memory address of the data; and
- using a counter to indicate a number of memory addresses from the starting memory address having the data.

19. The system of claim 14, wherein the application is configured to output the data matching the regex search request by receiving a value and address location corresponding to the data from the regex module.

20. The system of claim 14, wherein the regex module is located on the memory module.

* * * * *